(12) United States Patent
Kitanaka (10) Patent No.: US 7,667,430 B2
(45) Date of Patent: Feb. 23, 2010

(54) POWER STORAGE APPARATUS

(75) Inventor: Hidetoshi Kitanaka, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 166 days.

(21) Appl. No.: 11/990,944

(22) PCT Filed: Apr. 24, 2006

(86) PCT No.: PCT/JP2006/308575

§ 371 (c)(1),
(2), (4) Date: Feb. 25, 2008

(87) PCT Pub. No.: WO2007/122734

PCT Pub. Date: Nov. 1, 2007

(65) Prior Publication Data

US 2009/0256525 A1    Oct. 15, 2009

(51) Int. Cl.
*H01M 10/46*    (2006.01)
(52) U.S. Cl. .................. 320/107; 414/286
(58) Field of Classification Search ........... 320/107, 320/112, 114, 115, 116, 134, 136; 414/281, 414/282, 285, 286; 104/34, 88.01; 307/47, 307/48, 49; 701/19
See application file for complete search history.

(56) References Cited

U.S. PATENT DOCUMENTS 5,886,883 A * 3/1999 Rail ........................... 307/105

2004/0024502 A1 * 2/2004 Squires et al. ............... 701/33

FOREIGN PATENT DOCUMENTS

| JP | 2003-45384 A | 2/2003 |
| JP | 2003-243049 A | 8/2003 |
| JP | 2005-243580 A | 9/2005 |
| JP | 2006-14412 A | 1/2006 |

OTHER PUBLICATIONS

International Search Report dated Jul. 18, 2006.

* cited by examiner

*Primary Examiner*—Edward Tso
(74) *Attorney, Agent, or Firm*—Buchanan Ingersoll & Rooney PC (57) ABSTRACT

A power storage apparatus mounted with a plurality of connected power storage modules and capable of charging or discharging an electric power, and in which a housing is partitioned by a partition plate to be divided into a power storage area and a control device area; in the power storage area, an opening is formed, and the power storage modules are contained; in the control device area, an opening is formed, and a switching protective device section to switch and protect the power storage modules is contained; a main circuit wiring from the power storage modules is led out of the control device area via the switching protective device section; the opening of the power storage area is covered with a detachable cover; and the opening of the control device area is covered with a detachable cover independent of the cover of the opening of the power storage area.

20 Claims, 8 Drawing Sheets

POWER STORAGE APPARATUS

TECHNICAL FIELD

The present invention relates to a power-storage apparatus that stores and discharges a DC electric power.

BACKGROUND ART

As is known in the arts, a power storage system in which power storage modules such as secondary batteries or electric double layer capacitors are used to enable the charge or discharge of an electric power has been applied to a control device of electric motor vehicles. By this system, excess regenerative electric power generated at the time of braking of the vehicles is stored, and the stored electric power is used at the time of acceleration, thereby making it possible to effectively use a kinetic energy that the vehicles have (for example, Patent Document 1).

In the case where a power storage system is applied to any control device of electric motor vehicles, in a power storage apparatus being one component element of the power storage system, there are located power storage modules to store an electric power, and electrical parts of, e.g., a switching protective device section for protecting or making/breaking circuits, and further there are laid a main circuit wiring for a main circuit and a control circuit wiring for a control circuit for providing connection between them.

Patent Document 1: Japanese Patent Publication (unexamined) No. 14412/2006

PROBLEMS TO BE SOLVED BY THE INVENTION

Problems in construction of such a power storage apparatus are as follows.

First, power storage modules require a periodic inspection of whether the leakage of an electrolyte in the internal part is present or absent, or whether apparent abnormalities are present or absent; and moreover since they have a product life of about 5 to 10 years, the power storage modules have to be constructed taking the efficiency of inspection or replacing works into consideration. Furthermore, a large energy needs to be stored store in order to drive the electric motor vehicles. Thus, a plurality of power storage modules connected in series or in parallel is used, so that voltages at both ends of the plurality of power storage modules connected in series or in parallel come to be higher. Consequently, special considerations need to be paid from the viewpoint of prevention of an electric shock at the time of inspection or replacing works.

Further, in the case of occurrence of errors such as short circuit or breakdown at the power storage modules having a large energy or at the power storage apparatus, to avoid the expansion of damage, it is important to reliably activate a protective operation of, e.g., immediately interrupting circuits and reliably disconnecting the power storage modules from the system. Therefore, electrical parts of a switching protective device section, a control section thereof or the like, or a main circuit wiring or a control circuit wiring have to be arranged so as not to impair functions thereof even at the time of errors.

As described above, how the power storage modules, electrical parts of, e.g., a switching protective device section or a control section thereof, and each part of, e.g., a main circuit wiring or a control circuit wiring, which form main elements of power storage apparatus, are arranged, or how a housing thereof is structured, are extremely important problems to be solved in view of obtaining a power storage apparatus, which is easy to perform inspection or replacing works of power storage modules, and which is stable and safe. Heretofore, as a prior art related to the internal construction of a power storage apparatus, as shown in Patent Document 1, a device related to an insulating method has been proposed. However, there has been no disclosure related to the layout of each part and the structure of a housing useful for solving the problems as discussed above.

The invention has an object of providing a power storage apparatus capable of making it easy to execute inspection or replacing works of power storage modules, as well as making it possible to prevent the electric shock at the time of working, and capable of reliably performing a protective operation such as interruption of circuits without any damage to the electrical parts of, e.g., a switching protective device section or a control section, or a main circuit wiring or a control circuit wiring even at the time of occurrence of short circuit fault or at the time of breakdown of power storage modules.

MEANS OF SOLUTION TO THE PROBLEM

A power storage apparatus according to the invention is the one in which a plurality of connected power storage modules is mounted, and which can charge or discharge an electric power, the power storage apparatus being arranged such that:

a housing is partitioned by a partition plate to be divided into a power storage area and a control device area;

in the mentioned power storage area, an opening is formed, and the mentioned power storage modules are contained;

in the mentioned control device area, an opening is formed, and a switching protective device section acting to switch and protect the mentioned power storage modules is contained;

a main circuit wiring from the mentioned power storage modules for charging or discharging an electric power is led out of the mentioned control device area via the mentioned switching protective device section;

the opening of the mentioned power storage area is covered with a detachable cover; and the opening of the mentioned control device area is covered with a detachable cover independent of the mentioned cover of the opening of the mentioned power storage area.

Another power storage apparatus according to the invention is the one in which a plurality of connected power storage modules is mounted, and which can charge or discharge an electric power, the power storage apparatus being arranged such that:

a housing is partitioned by a partition plate to be divided into a power storage area and a control device area;

in the mentioned power storage area, an opening is formed, and the mentioned power storage modules are contained;

in the mentioned control device area, an opening is formed, and a switching protective device section acting to switch and protect the mentioned power storage modules and a control section acting to control the mentioned switching protective device section are contained;

a main circuit wiring from the mentioned power storage modules for charging or discharging an electric power is led out of the mentioned control device area via the mentioned switching protective device section;

the mentioned control section is connected to the mentioned switching protective device section through a control circuit wiring;

the mentioned control section controls switching of the mentioned switching protective device section;

the opening of the mentioned power storage area is covered with a detachable cover; and the opening of the mentioned control device area is covered with a detachable cover independent of the mentioned cover of the opening of the mentioned power storage area.

Furthermore, in the power storage apparatus according the invention, the mentioned power storage modules are mounted on pallets each located in the mentioned power storage area at a plurality of levels; each of the mentioned pallet is held with a guide rail provided at the mentioned power storage area; and each of the mentioned pallets on which the mentioned power storage modules are mounted is made to slide along the mentioned guide rail to be capable of being pulled out of the mentioned power storage area when the mentioned cover of the opening of the mentioned power storage area is removed.

EFFECTS OF THE INVENTION

According to the power storage apparatus of the invention, it is possible to prevent the electric shock at working. In addition, even when any short circuit fault occurs or when the power storage modules are broken, it is possible to obtain a protective operation such as interruption of circuit without damage to the electrical parts of the switching protective device section, the control section and the like, or to the main circuit wiring or the control circuit wiring. Furthermore, it is easy to execute inspection or replacing works of the power storage modules.

BEST MODE FOR CARRYING OUT THE INVENTION

Embodiment 1

Figure 1:
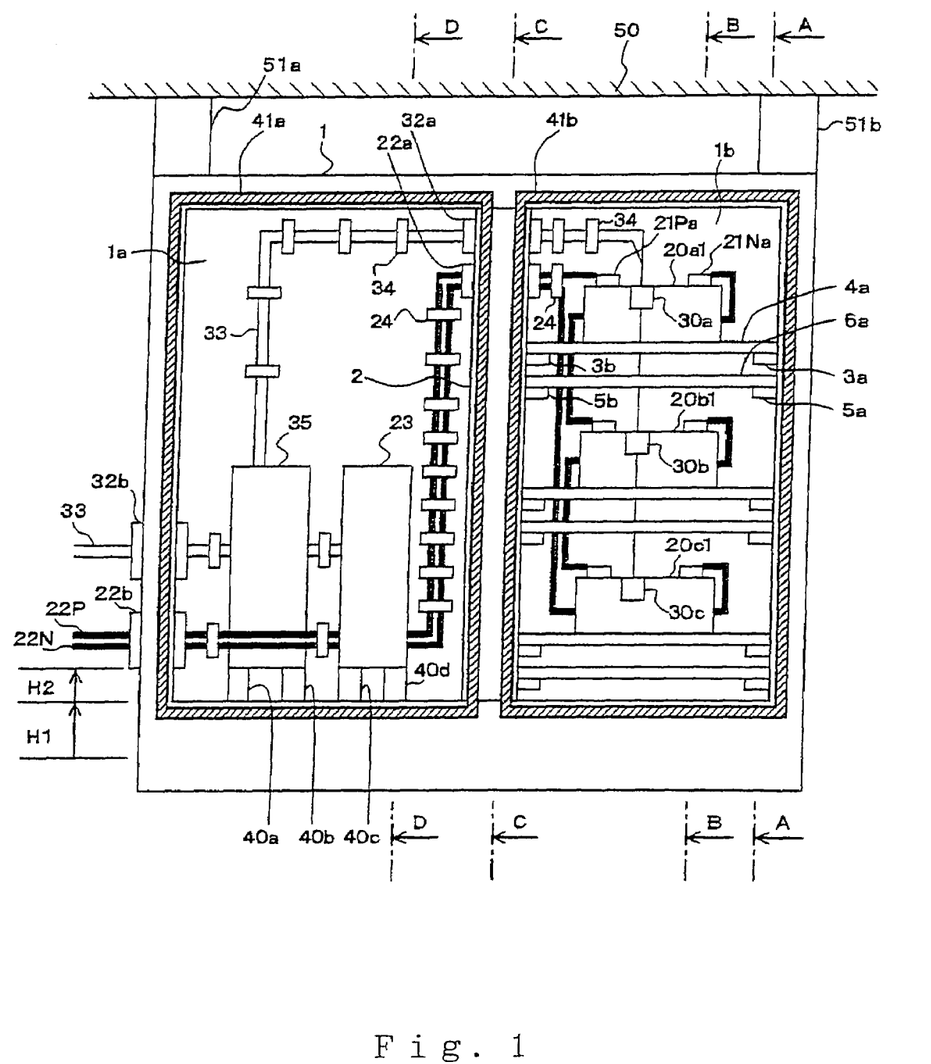
FIG. 1 is a front view with a front cover opened in a power storage apparatus according to a first preferred embodiment of the present invention.
Figure 2:
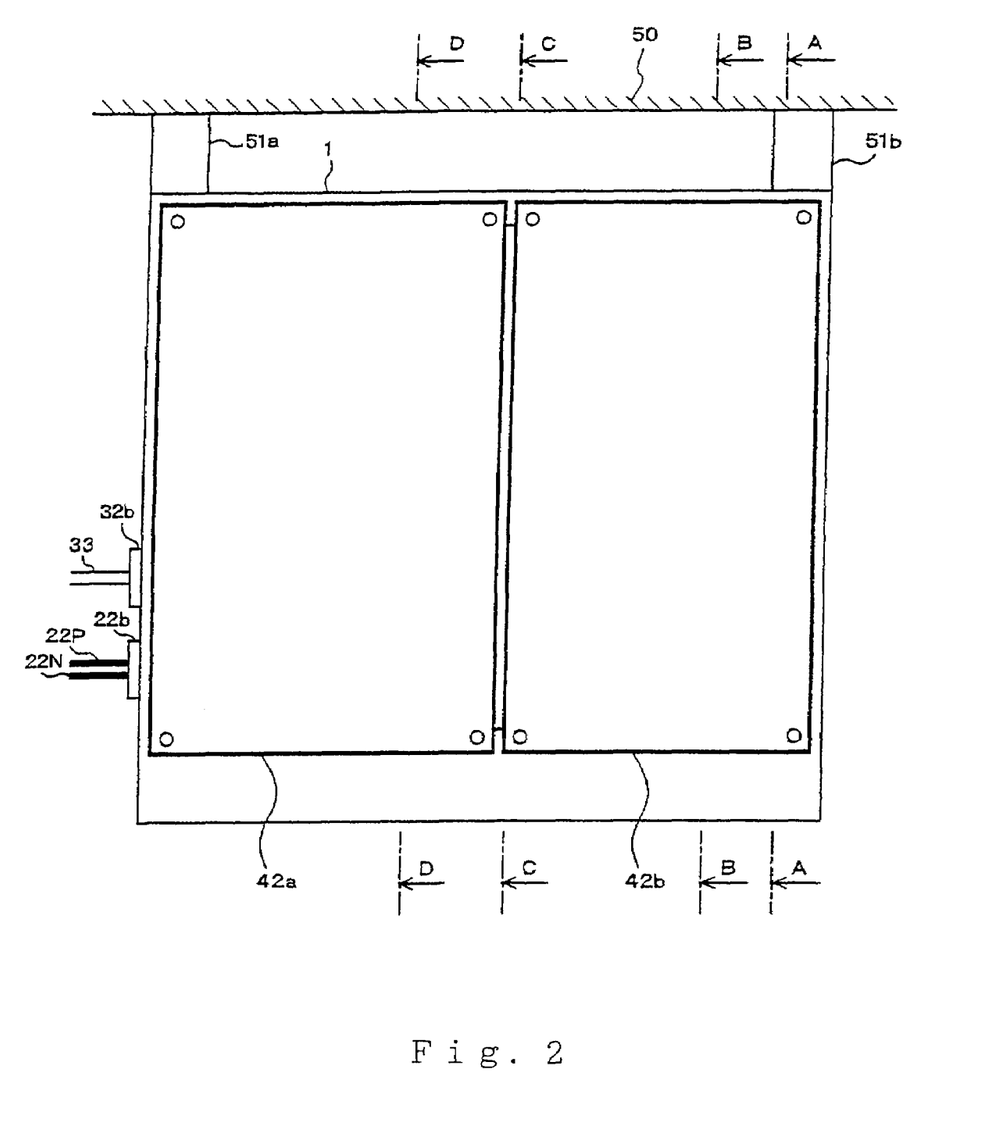
FIG. 2 is a front view with the front cover closed in the power storage apparatus according to the first embodiment.
Figure 3:
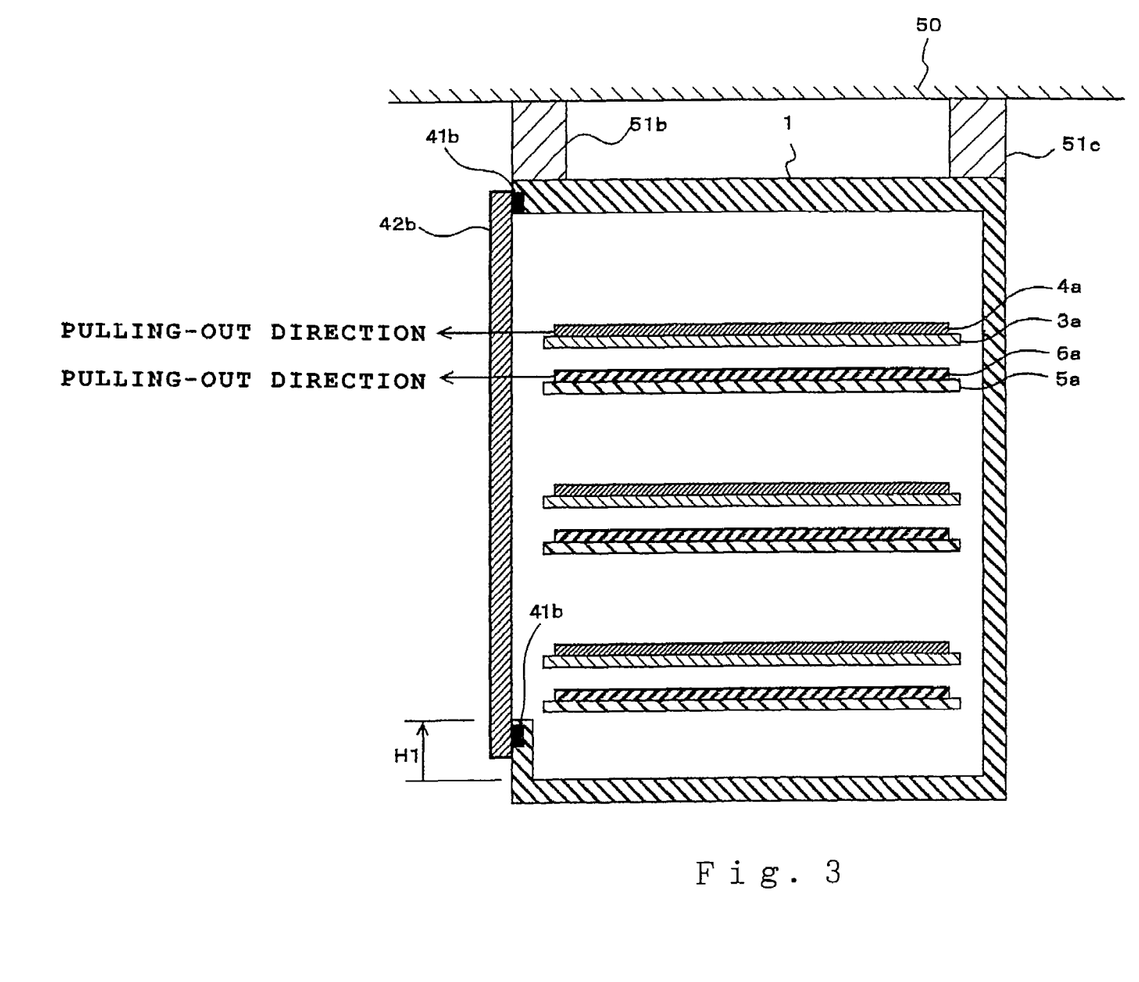
FIG. 3 is a sectional view taken along the line A-A with the front cover closed in the power storage apparatus of FIG. 1.
Figure 4:
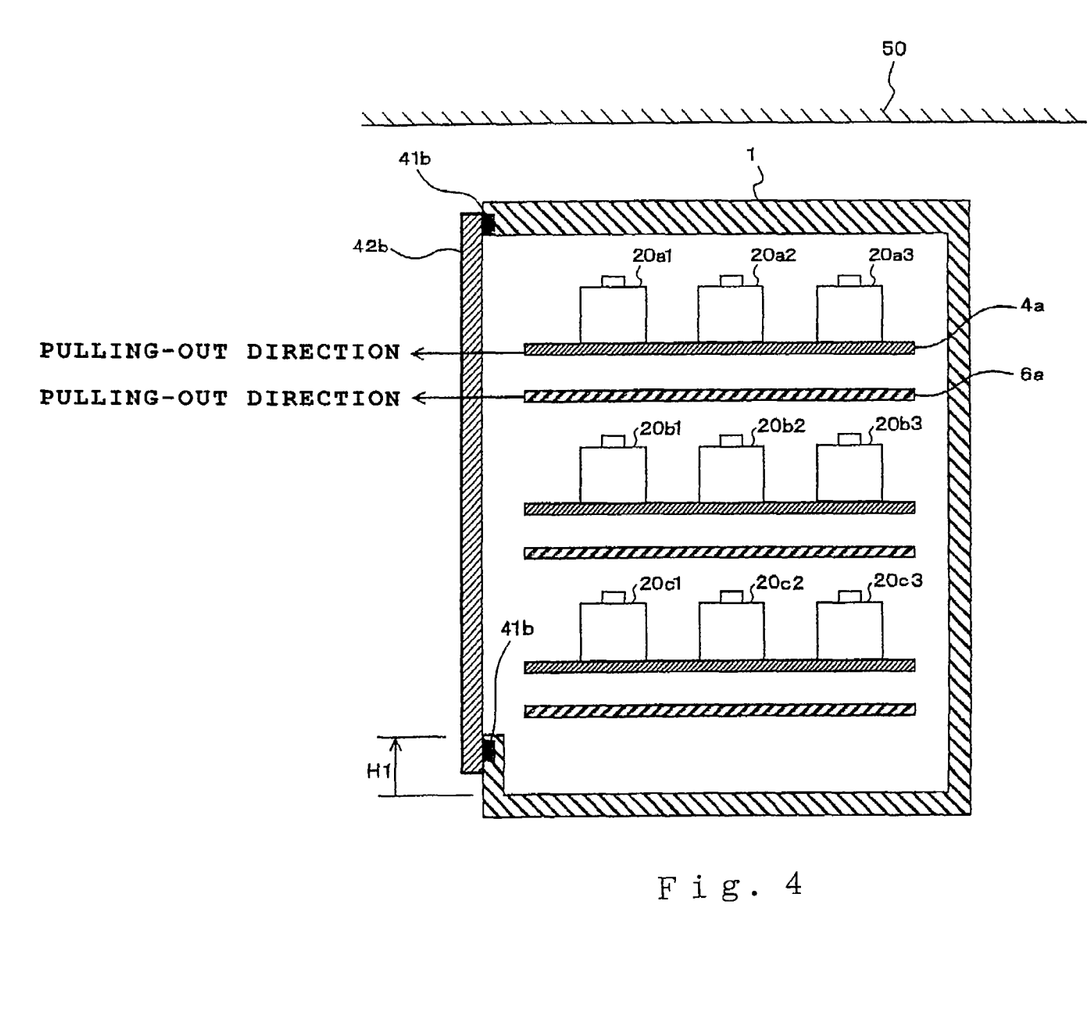
FIG. 4 is a sectional view taken along the line B-B with the front cover closed in the power storage apparatus of FIG. 1.
Figure 5:
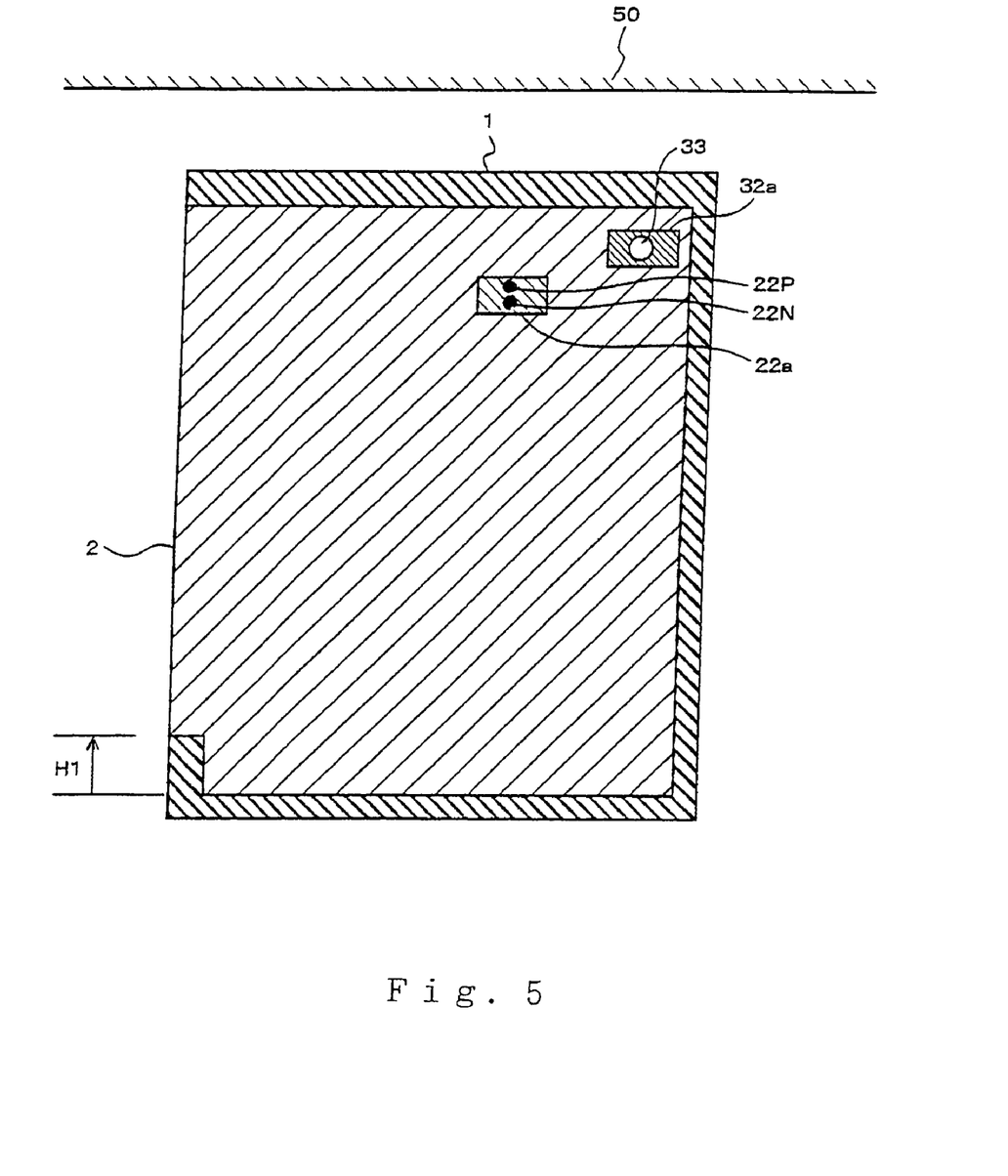
FIG. 5 is a sectional view taken along the line C-C with the front cover closed in the power storage apparatus of FIG. 1.
Figure 6:
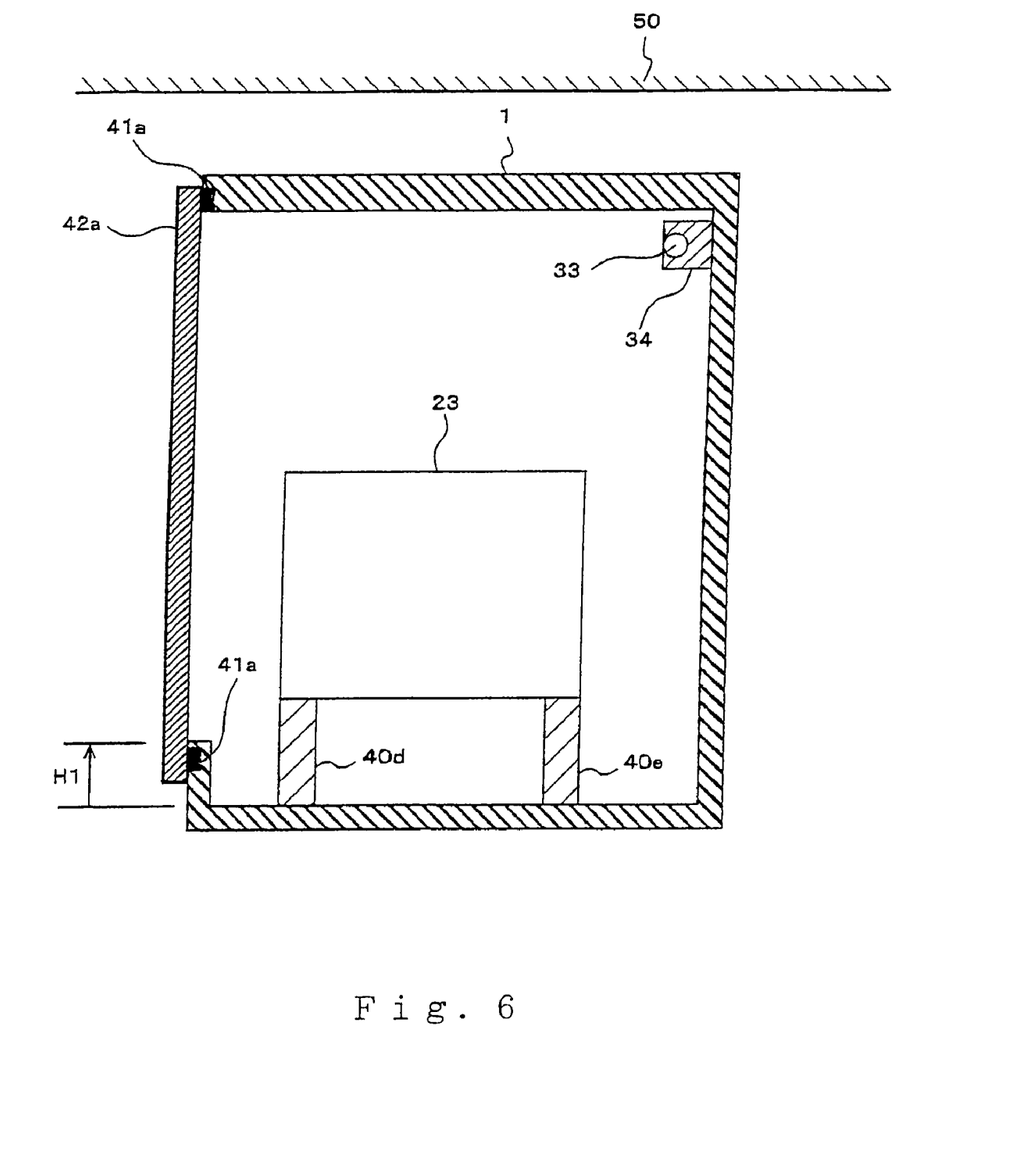
FIG. 6 is a sectional view taken along the line D-D with the front cover closed in the power storage apparatus of FIG. 1.

FIG. 1 is a front elevation (showing a state in which a front cover is opened) of a power storage apparatus according to a first preferred embodiment of the present invention. FIG. 2 is a front elevation (showing a state in which the front cover is closed) of the power storage apparatus according to the first embodiment. FIG. 3 is a sectional view taken along the line A-A (showing a state in which the front cover is closed) of the power storage apparatus of FIG. 1. FIG. 4 is a sectional view taken along the line B-B (showing a state in which the front cover is closed) of the power storage apparatus of FIG. 1. FIG. 5 is a sectional view taken along the line C-C (showing a state in which the front cover is closed) of the power storage apparatus of FIG. 1. FIG. 6 is a sectional view taken along the line D-D (showing a state in which the front cover is closed) of the power storage apparatus of FIG. 1.

As shown in FIGS. 1 to 6, main components contained in the power storage apparatus include power storage modules $20a1$-$20a3$, $20b1$-$20b3$, $20c1$-$20c3$ (FIG. 4), a state monitor $30a$ (FIG. 1), a control circuit wiring 33, main circuit wirings $22p$ and 22N, a control section 35, and a switching protective device section 23. These components are contained in a housing 1 to form a power storage apparatus. The power storage modules are constructed of a plurality of, for example, secondary batteries or electric double layer capacitors connected in series or in parallel.

The foregoing housing 1 is attached to a car body 50 (for example, under the floor of vehicles) via attachment members $51a$, $51b$, and $51c$. The housing 1 and the attachment members $51a$, $51b$, $51c$ are made of, for example, aluminum, stainless or iron, being any metal. Furthermore, although not shown, the control circuit wiring 33 and the main circuit wirings $22p$ and 22N are led out of the housing 1, and connected to any apparatus forming an external power storage system such as DCDC converters, to make the charge or discharge of an electric power while exchanging control signals. In addition, the control circuit wiring 33 is a bundle of lines constructed of a plurality of control circuit wirings.

Now, the structural arrangement of the power storage modules $20a1$-$20a3$, $20b1$-$20b3$, $20c1$-$20c3$ is described. In this regard, although there are up to the power storage modules $20a1$-$20a3$, $20b1$-$20b3$, $20c1$-$20c3$, the basic construction of them is the same. Thus, the following descriptions are made representatively focusing the power storage modules $20a1$-$20a3$ shown in the uppermost level part of FIG. 1.

The housing 1 is partitioned with a partition plate 2, to be divided into a power storage area $1b$ and a control device area $1a$. In the power storage area $1b$, there is provided a pallet 4 supported at both sides with guide rails 31 and $3b$ that are fixed to the housing 1 and the partition plate 2, and the power storage modules $20a1$-$20a3$ are mounted thereon (FIGS. 1 and 4). Under the pallet $4a$, there is provided an insulating plate $6a$ supported at both sides with guide rails $5a$ and $5b$ that are likewise fixed to the housing 1 and the partition plate 2. A state monitor $30a$ functioning to monitor voltage, current, temperature and the like is provided at the power storage modules $20a1$-$20a3$ mounted on the pallet 4. Further, signals from the state monitor $30a$ are connected to the control circuit wiring 33. In addition, the partition plate 2 and the guide rails $3a$, $3b$, $5a$, $5b$ are made of, for example, fiber reinforced plastics, being an insulating plate, or the same metal as that of the housing 1.

There are provided at each power storage module a positive terminal 21Pa and a negative terminal 21Na (FIG. 1), to be in structure of allowing an electric power to get. Further, the mass thereof is about several dozens kg, and thus the mass of a pallet $4a$ on which a plurality of power storage modules are mounted comes to be approximately 100 kg. The pallet $4a$ is made of fiber reinforced plastics or the same metal as that of the housing 1 in order to support the above-mentioned mass. The pallet $4a$ is perforated with holes at the portions not required to have much strength in order to achieve weight reduction, and so as to allow an electrolyte to drip to the insulating plate $6a$ under the pallet $4a$ in the case where the electrolyte existing in an internal part of the power storage modules is leaked.

The insulating plate $6a$ is a plate, which is made of an electrically insulating substance such as acryl, Bakelite, or reinforced plastics, and which is disposed right below the pallet $4a$. This insulating plate $6a$ is not perforated with holes all over the face so as not to allow an electrolyte to pass through but to receive all the electrolyte, to prevent the electrolyte from dripping, e.g., onto the power storage modules at the lower level in the case where the electrolyte is leaked out of the upper power storage modules. Thus, the mass of the insulating plate 6a is just several kg or so.

Owing to such construction, it becomes possible to allow the power storage modules 20a1-20a3 along with the pallet 4a to slide frontward along the guide rails 3a and 3b to pull out. At the time of inspection or replacing work of the power storage modules, the power storage modules are pulled out toward the front of the housing 1, that is, the power storage area 1b, and the inspection or replacing work of the power storage modules is executed. After the work has ended, the power storage modules are inserted again along with the pallet 4a. In this manner, it is possible to easily execute the inspection or replacing work of the power storage modules.

Further, owing to the insulating plate 6a, in the case of pulling out the power storage modules 20b1-20b3 at the lower level along with a pallet, it is possible to prevent any positive or negative terminal thereof from being in contact with the upper pallet 4a. Furthermore, in the case where the power storage modules are broken, and an electrolyte in the internal part is leaked out, it is possible to prevent the electrolyte from dripping onto the other power storage modules at the lower level and leading to expansion of damaged situation. Moreover, by pulling out the insulating plate 6a regularly to inspect whether or not any electrolyte is adhered to the surface of the insulating plate 6a, it is possible to confirm the presence or absence of the leakage of electrolyte from the power storage modules 20a1-20a3 without pulling out the power storage modules along with the pallet 4a.

In this regard, at points where the pallet 4a and the guide rails 3a and 3b are in contact, it is more preferable that any oil is applied or there are provided bearings in order to be less sliding friction and make it easy to pull out the pallet 4a. Furthermore, although the guide rails 3a and 3b are structured to support the underside of the pallet 4a, to eliminate displacement in the vertical direction of the pallet 4a, it is preferable that other guide rails are formed at the portion in contact with the top of the pallet 4a to be in construction of guiding the pallet 4a in the vertical direction.

The power storage modules, including those likewise constructed and disposed in each pallet of the middle level and the lower level, are connected in series and in parallel to each other. The positive terminal of the power storage module of which potential is the highest is connected to the main circuit wiring 22P on the positive side, and the negative terminal of the power storage module of which potential is the lowest is connected to the main circuit wiring 22N on the negative side. Although FIG. 1 schematically shows the wiring providing series-parallel connection between the power storage modules disposed on each pallet of the upper, middle, and lower levels, the connection lines between each of the levels are located, for example, on the rear side of the housing 1 so as not to impede smooth pulling-out of the pallets 4a and the insulating plates 6a. Further, it is preferable that the contacts on the positive and negative sides are formed on the rear side of the housing 1 at each of the upper, middle, and lower levels; and that both of those contacts are brought in an open circuit by pulling out each pallet, and they are brought in a closed circuit upon putting each pallet in storage. In addition, the power storage modules of pallets are not limited to the construction of three levels and one column as illustratively shown, but it is preferable to be constructed in other numbers of levels, or to be constructed in a plurality of columns.

Furthermore, the pallet of a power storage module of the highest potential is disposed at the uppermost level, and the pallet of a power storage module of the lowest potential is disposed at the lowermost level. Owing to this layout, as compared with the construction in which power storage modules are located varyingly with their potentials mixed, when the power storage modules are inspected or replaced, it is possible to visually understand potential level of the power storage modules intended to inspect or replace. Thus, it comes to be possible to carry out deliberate works taking into consideration that the power storage modules of higher potential are located at higher levels, thereby enabling an increased working efficiency.

The positive side main circuit wiring 22P and the negative side main circuit wiring 22N from power storage modules are connected to a switching protective device section 23 of the housing 1 that is a control device area 1a thorough a lead-through member 22a formed in the partition plate 2, pulled out of the housing 1 from the switching protective device section 23 through a lead-through member 22b, and connected to, e.g., an external DCDC converter. Furthermore, the control circuit wiring 33 is connected to a control section 35 of the control device area 1a through a lead-through member 32a formed in the partition plate 2, pulled out of the housing 1, and connected to an external monitoring control section (not shown). In addition, at the monitoring control section, states of the power storage modules are monitored, and, e.g., the DCDC converter is controlled. Furthermore, the control circuit wiring 33 is connected from the control section 35 to the switching protective device section 23, to switch the switching protective device section 23 depending on the states of power storage modules obtained from the monitors 30a. Additionally, the switching protective device section 23 is switched in response to signals from the monitoring section as well. Each lead-through member is made of an electrically insulating material, for example, rubber, nylon, or Bakelite.

The lead-through members 22a and 22b for the positive side main circuit wiring 22P and the negative side main circuit wiring 22N are lead-through members different from the lead-through members 32a and 32b for the control circuit wiring 33. These lead-through members are members for protecting the main circuit wirings 22p and 22N and the control circuit wiring 33 from being in contact with the end face of materials of the housing 1 and the partition plate 2 so as not to be damaged.

Herein, the switching protective device section 23 is a section constructed of devices for interrupting, or making or breaking the circuits, that is formed of fuses, circuit breakers, or ON/OFF switches. The control section 35 is a section of controlling operations of, e.g., the circuit breakers or the ON/OFF switches of the switching protective device section 23. Furthermore, the partition plate 2 functions to support the pallets 4a on which the power storage modules are mounted, as well as is located for providing separation between the power storage area 1b of the housing 1 in which power storage modules are disposed, and the control device area 1a of the housing 1 in which the switching protective device section 23 and the control section 35 are disposed.

The reason is, in the case where the power storage modules are broken to burst, to prevent the broken pieces or electrolyte thereof from scattering onto the switching protective device section 23 and the control section 35 to damage these devices. Owing to such construction, even when the power storage modules are broken, it becomes possible to allow the switching protective device section 23 and the control section 35 to be reliably in operation, and interrupt the circuits. Thus, it is possible to obtain a safe and stable power storage apparatus.

The main circuit wiring 22P on the positive side and the main circuit wiring 22N on the negative side are fixed to, e.g., the surface of walls of the housing 1 with fixing members 24. The control circuit wiring 33 is fixed to, e.g., the surface of walls of the housing 1 with fixing members 34. The fixing members are made of insulating materials such as cable ties of Bakelite, vinyl, or Teflon, or metals coated with rubber, which are suitably selected taking strength thereof into consideration. Furthermore, at the time of the occurrence of short circuit fault, since a high current flows through the positive side main circuit wiring 22P and the negative side main circuit wiring 22N, large electromagnetic forces in a direction of counteracting with each other are generated. In such a case, unless the main circuit wirings 22P and 22N are firmly fixed, there is a possibility that they are largely moved or deformed to damage the control circuit wiring 33, the control section 35, and the switching protective device section 23 resided therearound, thus impeding normal functions thereof.

To avoid such fault, the main circuit wirings 22P and 22N need to be fixed forming a rigid structure as compared with fixation of the control circuit wiring 33. The fixing members 24 are to be formed into a rigid structure as compared with the fixing members 34, and are disposed spaced apart from the control circuit wiring 33. For the same reason, the lead-through members 22a and 22b for the positive side main circuit wiring 22P and the negative side main circuit wiring 22N are lead-trough members different from the lead-through members 32a and 32b for the control circuit wiring 33.

Furthermore, the bottom of the switching protective device section 23 and the control section 35, with attachment members 40a to 40e, are raised to the level further higher by Height H2 than the lower end of openings positioned at height H1 from the bottom in the internal part of the housing 1, that is, the control device area 1a. The attachment members 40a to 40e, for example, may be made of the same material as that of a partition plate 2. The lead-through members 22b and 32b attached to the housing 1 are likewise raised as well. The reason why the lower end of the openings of the housing 1 is positioned up to the level of height H1 from the bottom in the internal part of the housing 1 is to prevent an electrolyte from flowing out of the housing 1 in the case where power storage modules are broken, thereby the electrolyte flowing out of the internal part thereof. Although the value of H1 depends on the amount of the electrolyte of the power storage modules, it is preferable to be about several centimeters.

In addition, owing to that the underside of the switching protective device section 23 and the control section 35 are disposed at Height H2 from the lower end of the openings, even in the case where the power storage modules are broken and the electrolyte in the internal part flows out, thereby an electrolyte entering the control device area 1a of the switching protective device section 23 and the control section 35 through, e.g., the gap between the partition plate 2 and the housing 1, it is possible to avoid the damage of the switching protective device section 23 and the control section 35 due to the electrolyte. Thus, it becomes possible to allow the switching protective device section 23 and the control section 35 to reliably operate to interrupt the circuits, as well as to prevent the damaged portions from being expanded.

Furthermore, owing to that the lead-through members 22b and 32b are disposed at Height H2 from the lower end of the openings, even when the power storage modules are broken and the electrolyte in the internal part flows out thereby any electrolyte entering the control device area 1a through, e.g., the gap between the partition plate 2 and the housing 1, it becomes possible to avoid the damage of the positive side main circuit wiring 22P and the negative side main circuit wiring 22N, the control circuit wiring 33, and the lea-through members 22b and 32b due to the electrolyte. Thus, it is possible to prevent the damaged portions from being expanded.

The gaskets 41a-41b are provided around the openings, to be in construction of allowing each of the control device area 1a and the power storage area 1b to be independently open or closed with covers 42a and 42b. Since it is constructed such that the cover member is divided into the two pieces of covers 42a and 42b, which can cover the control device area 1a and the power storage area 1b respectively, it comes to be possible to detach only one cover of the area to be inspected. Owing to this construction, for example, it is possible to open the cover 42 of the control device area 1a in which the switching protective device section 23 and the control section 35 are contained to execute an inspection work while the cover 42b of the power storage area 1b in which power storage modules that are charged and have potentials all the times is kept closed. Thus, there is an advantage of preventing an electric shock at the time of inspection work. It is preferable that the covers are fixed to the openings with bolts. Alternatively, it is preferable that a cover is just caught on one end of the opening, and the other end thereof is fitted, or it is preferable to be fitted with the use of bolts together.

Embodiment 2

Figure 7:
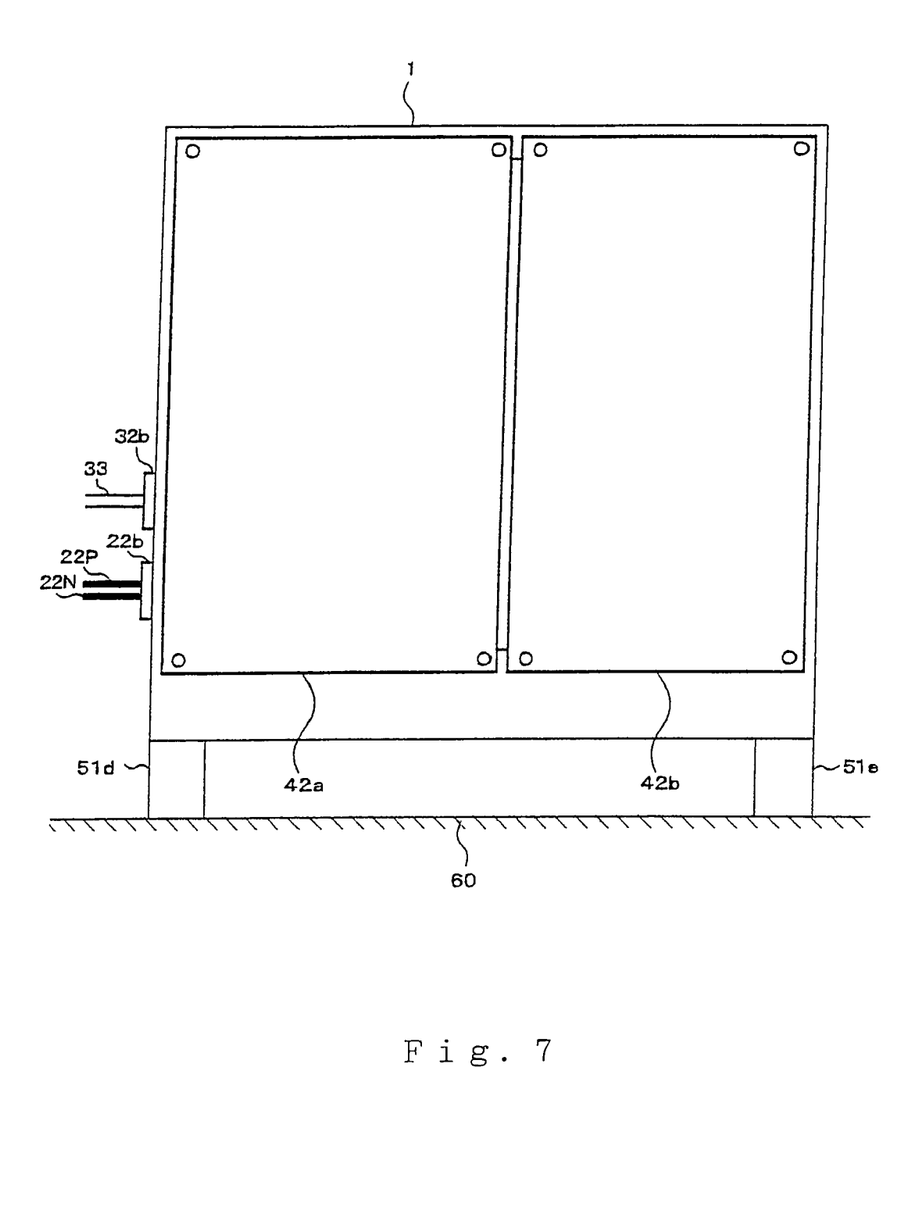
FIG. 7 is a front elevation with a front cover closed in a power storage apparatus according to a second embodiment.

FIG. 7 is a front view (showing a state in which a front cover is closed) of a power storage apparatus according to a second embodiment. In addition, the same reference numerals refer to the same or like parts to those of the other embodiments, and further descriptions thereof are omitted. This power storage apparatus is intended to mount on the floor or on the roof 60 of vehicles, and there are provided at the underside of the housing 1 attachment members 51d and 51e. Thus, the power storage apparatus can be applied to any structure in which the housing 1 is mounted at the underside of the vehicles, in which it is mounted on a roof thereof, or in which it is mounted on the floor in the vehicles.

Owing to the constructions employed in the first and second embodiments as shown above, it is easy to execute inspection and replacing works of the power storage modules, as well as it is possible to prevent the electric shock at the time of working. Furthermore, it becomes possible to obtain a power storage apparatus in construction enabling to reliably perform operations such as interruption of circuits without damage to the electrical parts of a switching protective device section, a control section and the like, a main circuit wiring, or a control circuit wiring even when any short circuit fault occurs, or when the power storage modules are broken.

Embodiment 3

Figure 8:
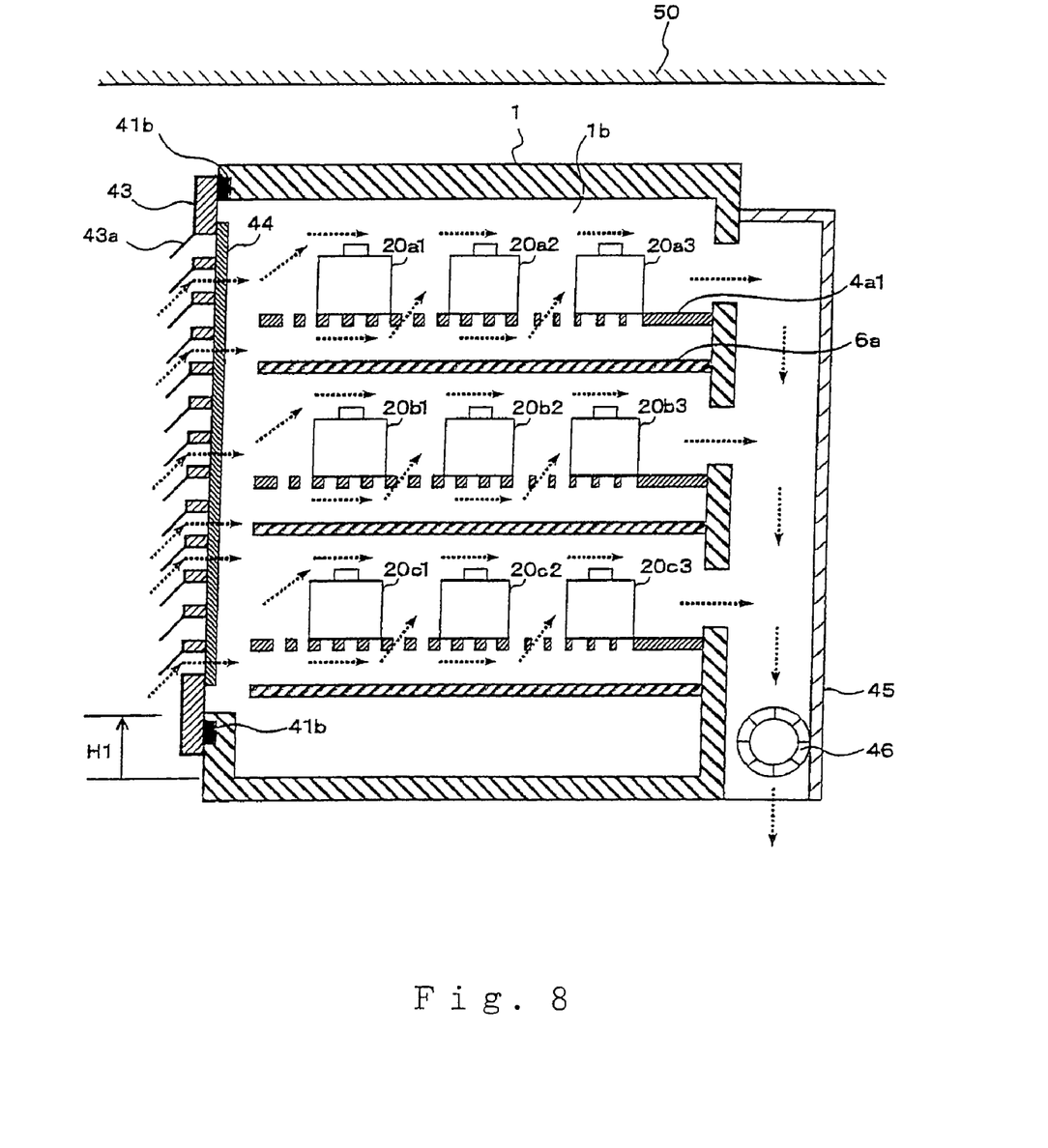
FIG. 8 is a schematic sectional view with a front cover closed in a power storage apparatus according to a third embodiment.

FIG. 8 is a schematic sectional view (showing a state in which a front cover is closed) of a power storage apparatus according to a third embodiment. FIG. 8 corresponds to FIG. 4, being a cross section taken along line B-B of the first embodiment. Herein, parts of construction different from that shown in the first embodiment are described. In the third embodiment, it is intended that power storage modules 20a1-20a3, 20b1-20b3, 20c1-20c3 are effectively cooled. In the drawing, the arrows indicate the flow of a cooling air. There are provided at a detachable cover 43 of the power storage area 1b rainproof members 43a and an air filter 44. In pallets 4a1 that can be pulled out of the power storage area 1b, holes are made larger in a downstream direction, to be constructed to cool more equally the power storage modules 20a1-20a3, 20*b*1-20*b*3, 20*c*1-20*c*3. There is provided at the backside of the housing 1 an air duct 45. An air-blower 46 is disposed in the air duct 45.

With the holes formed in the pallets 4*a*1, it is possible to flow a sufficient air also around the power storage modules disposed downstream (for example, 20*a*3). The pallets are located at a plurality of levels as in the first embodiment. Along the course indicated by the arrows, the cooling air is sucked through the cover 43, is led to each of the power storage modules through the holes of the pallets of each level, cools each of the power storage modules, and discharged from the bottom of the housing 1 through the air duct 45. In addition, the flow of cooling air is not limited to this example, but it is preferable to be constructed such that air is sucked through another points, and discharged out of the cover 43.

Owing to such construction, it comes to be possible to forcibly cool the power storage modules in addition to the advantages shown in the first embodiment, and thus it is possible to obtain a small-sized and light-weighted power storage apparatus. Furthermore, the cover mounted onto the openings originally formed in the housing 1 is structured to allow a cooling air to pass, so that as to the suction of the cooling air, no air inlet needs to be newly formed at any other position of the housing 1, and thus the strength of the housing 1 is not impaired. Although shown is the case where the power storage modules in the power storage area are forced to cool, it is preferable to forcibly cool the control device area.

Additionally, although the first, second, and third embodiments are described to have a construction in which the parts forming a power storage apparatus (power storage modules, switching protective device section, and control section) are contained in the housing 1 dedicated for the power storage apparatus, the power storage apparatus according to the invention is not limited to such embodiments. For example, even in the case in which a part of a housing of, e.g., DCDC converter or inverter, which forms a power storage system, is partitioned off for use as a power storage area and a control device area with partition plates; there are provided covers at openings formed individually; and parts forming the power storage apparatus are contained therein, it is possible to apply contents disclosed in the aforementioned embodiments as a matter of course.

INDUSTRIAL APPLICABILITY

In this specification, descriptions are made taking a power storage apparatus to be applied to a power storage system mounted onto railway vehicles. The field of application is not limited to such a field of vehicles, but can be applied to various related fields such as a ground-based power storage system in the field of railway, automobiles, elevators, and electric power systems, as a matte or course.

The invention claimed is:

1. A power storage apparatus in which a plurality of connected power storage modules is mounted, and which can charge or discharge an electric power:
wherein a housing is partitioned by a partition plate to be divided into a power storage area and a control device area;
in said power storage area, an opening is formed, and said power storage modules are contained;
in said control device area, an opening is formed, and a switching protective device section acting to switch and protect said power storage modules is contained;
a main circuit wiring from said power storage modules for charging or discharging an electric power is led out of said control device area via said switching protective device section;
the opening of said power storage area is covered with a detachable cover;
the opening of said control device area is covered with a detachable cover independent of said cover of the opening of said power storage area;
said power storage modules are mounted on pallets provided in said power storage area in such a way as to form a plurality of stages;
said pallets are held by guide rails fixed in said power storage area; and
when said cover of the opening of said power storage area is removed, said pallets on which said power storage modules are mounted can be pulled out of said power storage area, by being slid along said guide rails.

2. A power storage apparatus in which a plurality of connected power storage modules is mounted, and which can charge or discharge an electric power:
wherein a housing is partitioned by a partition plate to be divided into a power storage area and a control device area;
in said power storage area, an opening is formed, and said power storage modules are contained;
in said control device area, an opening is formed, and a switching protective device section acting to switch and protect said power storage modules and a control section acting to control said switching protective device section are contained;
a main circuit wiring from said power storage modules for charging or discharging an electric power is led out of said control device area via said switching protective device section;
said control section is connected to said switching protective device section through a control circuit wiring;
said control section controls switching of said switching protective device section;
the opening of said power storage area is covered with a detachable cover; and
the opening of said control device area is covered with a detachable cover independent of said cover of the opening of said power storage area;
said power storage modules are mounted on pallets provided in said power storage area in such a way as to form a plurality of stages;
said pallets are held by guide rails fixed in said power storage area; and
when said cover of the opening of said power storage area is removed, said pallets on which said power storage modules are mounted can be pulled out of said power storage area, by being slid along said guide rails.

3. The power storage apparatus according to claim 1, wherein said power storage modules are mounted on a pallet located in said power storage area at a plurality of levels; each pallet is held with a guide rail fixed at said power storage area; and each pallet on which each of said power storage modules is mounted is made to slide along said guide rail to be capable of being pulled out of said power storage area when said cover of the opening of said power storage area is removed.

4. The power storage apparatus according to claim 3, wherein under each said pallet, there is provided an insulating plate functioning to prevent an electrolyte leaked out of said power storage modules from passing through; each said insulating plate is held by a guide rail fixed at said power storage area; and each said insulating plate is made to slide along said guide rail to be capable of being pulled out of said power storage area when said cover of the opening of said power storage area is removed.

5. The power storage apparatus according to claim 2, wherein said power storage modules are mounted on a pallet located in said power storage area at a plurality of levels; each pallet is held with a guide rail fixed at said power storage area; and each pallet on which each of said power storage modules is mounted is made to slide along said guide rail to be capable of being pulled out of said power storage area when said cover of the opening of said power storage area is removed.

6. The power storage apparatus according to claim 5, wherein tinder each said pallet, there is provided an insulating plate functioning to prevent an electrolyte leaked out of said power storage modules from passing through; each said insulating plate is held by a guide rail fixed at said power storage area; and each said insulating plate is made to slide along said guide rail to be capable of being pulled out of said power storage area when said cover of the opening of said power storage area is removed.

7. A power storage apparatus in which a plurality of connected power storage modules is mounted, and which can charge or discharge an electric power,
wherein a housing is partitioned by a partition plate to be divided into a power storage area and a control device area;
in said power storage area, an opening is formed, and said power storage modules are contained;
in said control device area, an opening is formed, and a switching protective device section acting to switch and protect said power storage modules is contained;
a main circuit wiring from said power storage modules for charging or discharging electric power is led out of said control device area via said switching protective device section;
the opening of said power storage area is covered with a detachable cover;
the opening of said control device area is covered with a detachable cover independent of said cover of the opening of said power storage area; and
said power storage modules are disposed to laminate in such order that a power storage module, of the highest earth potential is positioned at the upper portion of said power storage area, and a power storage module of the lowest earth potential is positioned at the lower portion of said power storage area.

8. A power storage apparatus in which a plurality of connected power storage modules is mounted, and which can charge or discharge electric power,
wherein a housing is partitioned by a partition plate to be divided into a power storage area and a control device area;
in said power storage area, an opening is formed, and said power storage modules are contained in a stage by stage manner;
in said control device area, an opening is formed, and switching protective device section acting to switch and protect said power storage modules is contained;
a main circuit wiring from said power storage modules for charging or discharging electric power is led out of said control device area via said switching protective device section;
the opening of said power storage area is covered with a detachable cover;
the opening of said control device area is covered with a detachable cover independent of said cover of the opening of said power storage area; and the lower end of said opening provided at the side surface of said housing is positioned higher than the bottom of said housing.

9. A power storage apparatus in which a plurality of connected power storage modules is mounted, and which can charge or discharge electric power,
wherein a housing is partitioned by a partition plate to be divided into a power storage area and a control device area;
in said power storage area, an opening is formed, and said power storage modules are contained in a state by stage manner;
in said control device area, an opening is formed, and a switching protective device section acting to switch and protect said power storage modules and a control section acting to control said switching protective device section are contained;
a main circuit wiring from said power storage modules for charging or discharging electric power is led out of said control device area via said switching protective device section;
said control section is connected to said switching protective device section through a control circuit wiring;
said control section switches and controls said switching protective device section;
the opening of said power storage covered with a detachable cover;
the opening of said control device area is covered with a detachable cover independent of said cover of the opening of said power storage area; and
said switching protective device section and said control section are disposed at positions higher than the lower end of said opening at the side surface of said housing.

10. A power storage apparatus in which a plurality of connected power storage modules is mounted, and which can charge or discharge electric power,
wherein a housing is partitioned by a partition plate to be divided into a power storage area and a control device area;
in said power storage area, an opening is formed, and said power storage modules are contained in a stage by stage manner;
in said control device area, an opening is formed, and a switching protective device section acting to switch and protect said power storage modules is contained;
a main circuit wiring from said power storage modules for charging or discharging electric power is led out of said control device area via said switching protective device section;
the opening of said power storage area is covered with a detachable cover,
the opening of said control device area is covered with a detachable cover independent of said cover of the opening of said power storage area; and
the position of said main circuit wiring led out of said control device area is higher than the lower end of said opening provided at the side surface of said housing.

11. The power storage apparatus according to claim 2, wherein said main circuit wiring and said control circuit wiring are fixed individually to an internal part of said housing with the use of different fixing members.

12. The power storage apparatus according to claim 2, wherein said main circuit wiring and said control circuit wiring are made to pass through said partition plate with the use of different lead-through members.

13. The power storage apparatus according to claim 1, wherein a cooling air can come and go through said cover, and there is provided an air blower at the backside of said housing.

14. The power storage apparatus according to claim 9, wherein said main circuit wiring and said control circuit wiring are fixed individually to an internal part of said housing with the use of different fixing members.

15. The power storage apparatus according to claim 9, wherein said main circuit wiring and said control circuit wiring are made to pass through said partition plate with the use of different lead-through members.

16. The power storage apparatus according to claim 2, wherein a cooling air can come and go through said cover, and there is provided an air blower at the backside of said housing.

17. The power storage apparatus according to claim 7, wherein a cooling air can come and go through said cover, and there is provided an air blower at the backside of said housing.

18. The power storage apparatus according to claim 8, wherein a cooling air can come and go through said cover, and there is provided an air blower at the backside of said housing.

19. The power storage apparatus according to claim 9, wherein a cooling air can come and go through said cover and there is provided an air blower at the backside of said housing.

20. The power storage apparatus according to claim 10, wherein a cooling air can come and go through said cover, and there is provided an air blower at the backside of said housing.

* * * * *